United States Patent [19]

Ford

[11] Patent Number: 4,945,520

[45] Date of Patent: Jul. 31, 1990

[54] HYDRO-ACOUSTIC DEVICE FOR WARNING SEA MAMMALS

[76] Inventor: Thomas J. Ford, 209 Harvard St., #206, Brookline, Mass. 02146

[21] Appl. No.: 413,067

[22] Filed: Sep. 27, 1989

[51] Int. Cl.⁵ .......................................... H04B 11/00
[52] U.S. Cl. ...................................... 367/191; 367/1; 181/123; 43/4.5
[58] Field of Search ..................... 367/1, 191; 181/0.5, 181/123; 43/4, 4.5

[56] References Cited

U.S. PATENT DOCUMENTS

| | | | |
|---|---|---|---|
| 1,226,348 | 5/1917 | McGray | 367/191 |
| 2,465,993 | 4/1949 | Beechlyn | 367/131 |
| 3,177,466 | 4/1965 | Arnoldi | 367/1 |
| 3,195,677 | 7/1965 | Hillery et al. | 367/1 |
| 4,090,171 | 5/1978 | Bulmer et al. | 367/1 |
| 4,219,886 | 8/1980 | Anderson | 367/1 |
| 4,815,049 | 3/1989 | Konrad | 367/1 |

Primary Examiner—Charles T. Jordan
Assistant Examiner—J. Woodrow Eldred
Attorney, Agent, or Firm—Joseph H. Killion

[57] ABSTRACT

A passive hydro-acoustic device for warning sea mammals away from shallow areas consisting of an anchor linearly arranged in front of a shallow area and a plurality of cables attached to the anchor at predefined intervals and extending substantially perpendicular therefrom and sonar reflecters affixed to each of the cables.

2 Claims, 2 Drawing Sheets

HYDRO-ACOUSTIC DEVICE FOR WARNING SEA MAMMALS

BACKGROUND OF INVENTION

My invention relates to a warning device for sea mammals, specifically Odontocetes, and more specifically dolphins, or whales, upon their approach to a shoal area.

My invention also provides a means to funnel or guide these animals.

It is well known that whales and dolphins utilize sonar to sense land and solid objects in the water.

What is not so well understood is the cause of the periodic stranding of whole schools of these mammals. These strandings result in needless mass deaths, injuries and significant clean-up problems.

Further strandings occur and recur at specific places such as the beachings at Eastham on Oct. 6, 1984—94 Pilot Whales; Eastham on Oct. 9, 1984—9 Pilot Whales; Kingsbury Beach on Dec. 6, 1981—12 Pilot Whales; Wellfleet on Nov. 16, 1982—68 Pilot Whales.

Inventor subscribes to the theory that sonar utilized by the herd leader returns a false report of deep water and the school finds itself stranded before it realizes what is happening. Certain beach areas characterized by a long, sloping, shallow basin are susceptible over and over again to sea mammal strandings. These areas are well known to marine biologists.

The prior art is skimpy with respect to passive sonar devices. The majority of the prior art comprises active sonar devices.

For example U.S. Pat. No. 4,488,271 relates a deep ocean wide band acoustic baffle. This device discloses a hyudracoustic transducer which provides a hemispherical radiation pattern in the desired frequency and pressure.

U.S. Pat. No. 4,546,459 discloses a method and apparatus for a phased array transducer. This again is an active hydroacoustic device.

What is needed is a passive hydracoustic device which reacts to the sonar emitted by the sea mammels to warn them off the shoal area, which makes sense economically and which does not interfere with marine surface traffic, or other forms of marine life.

SUMMARY OF INVENTION

My invention relates to a warning device, particularly a hydro-acoustic warning device and more particularly to a passive hydro-acoustic warning device to sea mammels in shoal areas.

I have discovered a hydro-acoustic warning device comprising an anchor linarly arranged in front of a problem area. Attached to the anchor are a plurality of substantially perpendicular cables each of which has affixed to it a hollow annular hydro-acoustic reflector.

While I prefer that my device be arranged at a depth beneath the water with the hollow annular hydro-acoustic reflector extending upwardly from the anchor means, of course my invention also contemplates a floating anchor system with downwardly extending cables and weighted annular hydro-acoustic reflectors. In addition, I also contemplate that my hydro acoustic warning device be combined with floating devices such as fishing nets, to prevent the entanglement of large mammals in these nets. I also contemplate that my invention could be utilized to create a sonar shield which submarines could hide behind. Also I contemplate that my invention could be used to form "controls" in the open sea. For example porpoises could be "corralled" by my invention and the tuna which often travel underneath them could be harvested. I do prefer the submerged embodiment since it does not inverfere with surface marine traffic.

My invention provides numerous advantages over those devices found in the prior art.

Some advantages of my invention are that it is easily manufactured, economical, readily set in place and effective.

As will be shown in the preferred embodiment, I prefer the hollow annular hydro-acoustic reflector to be filled with a gas, including air, and to extend upwardly from the anchor. In addition, as long as the device has the disclosed characteristics, size is not vital as the device can be virtually any diameter and length, although thin walled, annular, hydro-acoustic reflectors are preferred.

It is to be understood that the drawings illustrate merely a preferred embodiment of my invention and that other embodiments are contemplated within the scope of the claims hereinafter set out.

DETAILED DESCRIPTION OF THE DRAWINGS

Figure 1:
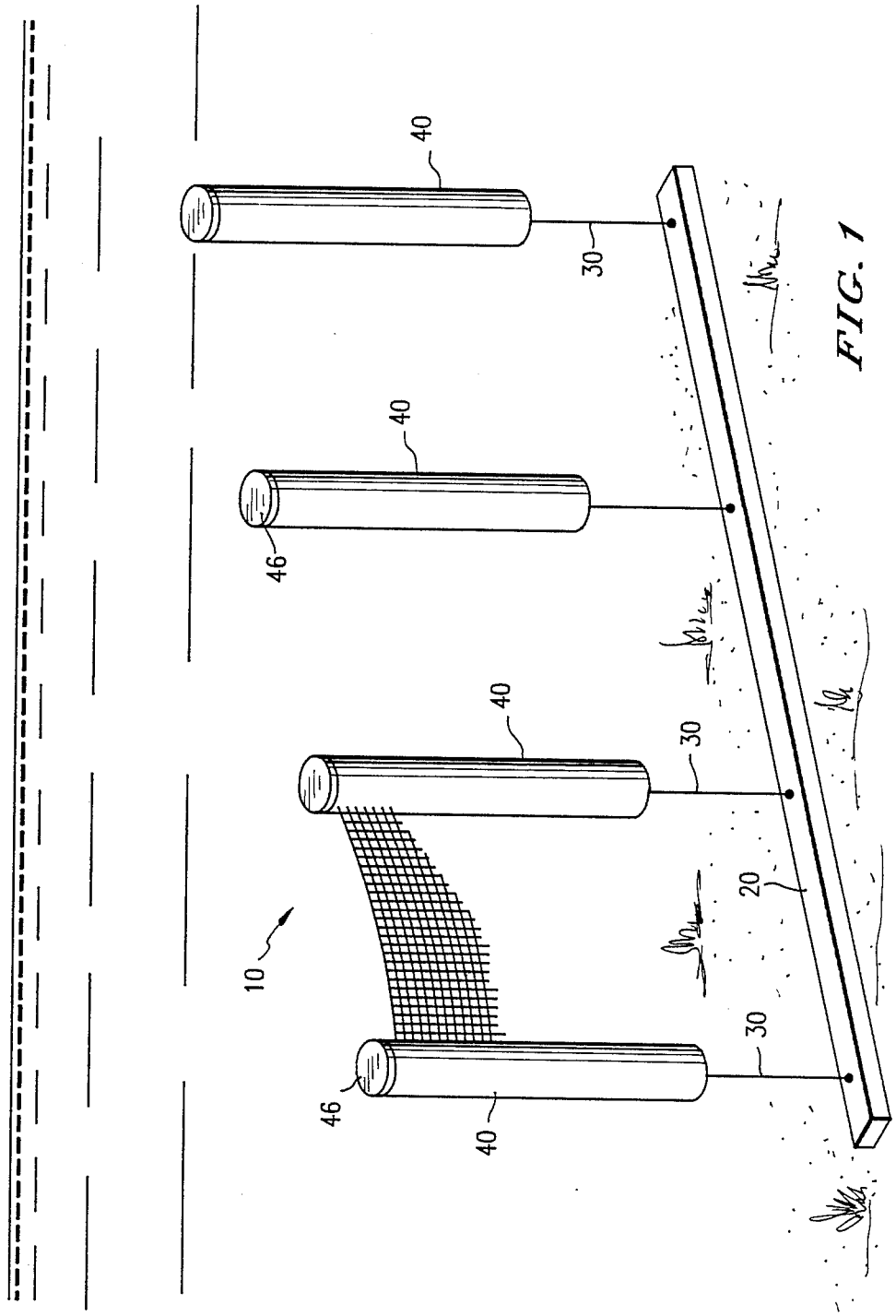
FIG. 1 is an isometric plane view of the passive hydro-acoustic device for warning sea mammals.

Referring now in particular to the accompanying drawing, the preferred form of my passive hydroacoustic warning device for sea mammals is generally indicated at 10 in FIG. 1.

Figures 1A, 1B:
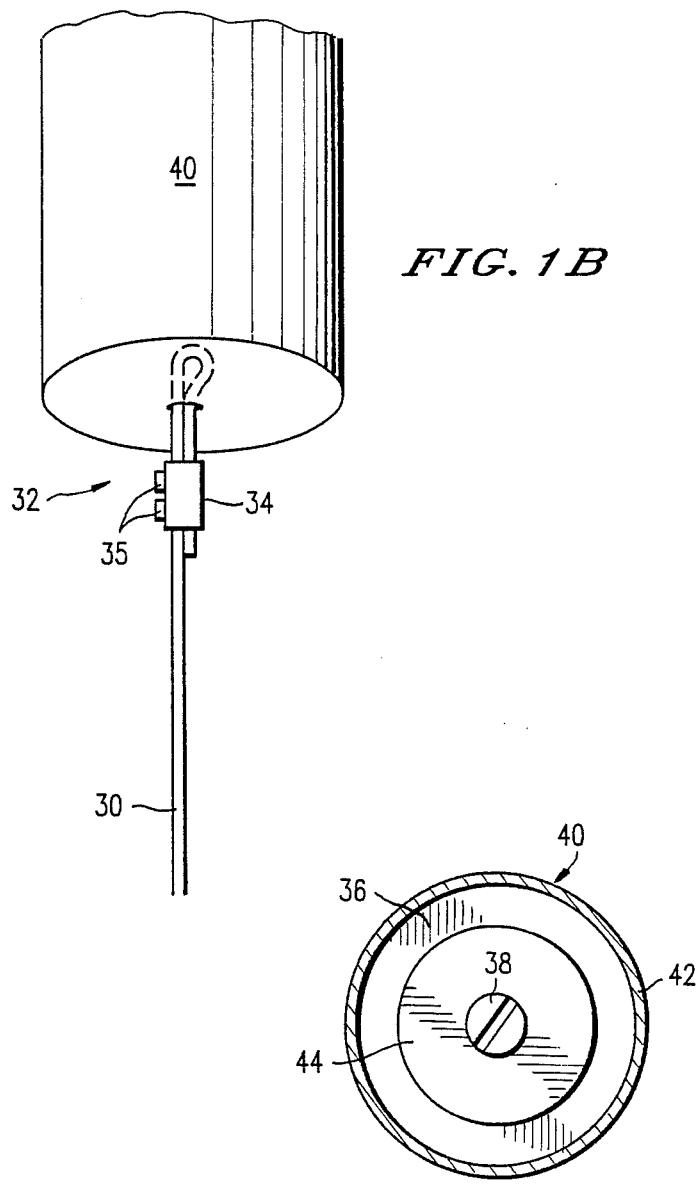
FIG. 1A is a cut-away top view cross section of the hollow annular hydro-acoustic reflector.
FIG. 1B is an enlarged perspective view of the upper end of the cable.

Anchor 20, is weighted to lie along the bottom in shoal areas. Lightweight plastic cable 30 is screwed into the anchor at periodic intervals utilizing aluminium screws 22 (not shown). The upper end 32, of the cable is doubled back and joined to itself by lock 34 (FIG. 1B) having screws 35. Aluminum round attaching plate 36, has a hole 37, (not shown) in the centre thereof through which screw 38 (FIG. 1A) is screwed into bolt 39 (FIG. 1B) to attach the hollow annular hydro-acoustic float.

Hollow annular hydro-acoustic float 40 (FIG. A) tops the hollow annular wall 42, and washer 44, through which screw 38, is attached to affix the hydroacoustic float to the cable. Cap 46 (FIG. 1) tops the hollow annular hydro-acoustic float to prevent the escape of the gas (usually air). These hollow annular hydro-acoustic floats are arranged every 6 to 8 feet in the preferred embodiment.

In use the device is assembled and the anchor is then arranged as desired on the ocean floor. The hollow annular hydro-acoustic floats then float at the end of the cable length, about 8 to 10 feet deep (low enough to avoid boats at low tide). When a whale emits sonar signals these signals are reflected (since sonar emittances are circular in form and conical in depth).

What I claim is:

1. A passive hydro-acoustic device for warning sea mammals away from shallow areas comprising:
   a. anchor means linearly arranged in front of a shallow area;

b. a plurality of cable means attached to said anchor means at predefined intervals and extending substantially perpendicular therefrom;
c. a hollow annular member attached at a first end of said cable means and containing a gas therein;
d. cap means affixed to a second end of said hollow annular member sealing said hollow annular member.

2. The passive hydro-acoustic device of claim 1, further comprising:
a. fishing net means affixed to said passive hydro-acoustic device.

* * * * *